(12) United States Patent
Yoo et al.

(10) Patent No.: US 10,785,478 B2
(45) Date of Patent: Sep. 22, 2020

(54) INTRA PREDICTION METHOD AND APPARATUS FOR VIDEO CODING

(71) Applicant: LG Electronics Inc., Seoul (KR)

(72) Inventors: Sunmi Yoo, Seoul (KR); Bumshik Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 46 days.

(21) Appl. No.: 16/301,088

(22) PCT Filed: May 12, 2016

(86) PCT No.: PCT/KR2016/005013
§ 371 (c)(1),
(2) Date: Nov. 13, 2018

(87) PCT Pub. No.: WO2017/195917
PCT Pub. Date: Nov. 16, 2017

(65) Prior Publication Data
US 2019/0191156 A1    Jun. 20, 2019

(51) Int. Cl.
*H04N 19/192* (2014.01)
*H04N 19/11* (2014.01)
(Continued)

(52) U.S. Cl.
CPC .......... *H04N 19/11* (2014.11); *H04N 19/105* (2014.11); *H04N 19/124* (2014.11);
(Continued)

(58) Field of Classification Search
CPC .... H04N 19/11; H04N 19/105; H04N 19/124; H04N 19/132; H04N 19/159;
(Continued)

(56) References Cited

U.S. PATENT DOCUMENTS

2006/0013312 A1* 1/2006 Han ............... H04N 19/134
375/240.19
2013/0114732 A1* 5/2013 Dong ............... G06F 17/147
375/240.19

FOREIGN PATENT DOCUMENTS

JP     2015146624     8/2015
KR    20110002557    1/2011
(Continued)

*Primary Examiner* — Ayman A Abaza
(74) *Attorney, Agent, or Firm* — Fish & Richardson P.C.

(57) ABSTRACT

A picture encoding method that includes selecting a $V^{th}$ basis function for a current block according to a specific order from among basis functions; deriving a $V^{th}$ expansion coefficient on the basis of the selected $V^{th}$ basis function; calculating a $V^{th}$ weighted error criterion on the basis of the selected $V^{th}$ basis function and the derived $V^{th}$ expansion coefficient; and encoding and outputting information indicating the $V^{th}$ number as a basis number when the value of the $V^{th}$ weighted error criterion is less than a specific critical value.

12 Claims, 10 Drawing Sheets

(51) Int. Cl.
*H04N 19/105* (2014.01)
*H04N 19/593* (2014.01)
*H04N 19/132* (2014.01)
*H04N 19/159* (2014.01)
*H04N 19/124* (2014.01)
*H04N 19/176* (2014.01)
*H04N 19/46* (2014.01)

(52) U.S. Cl.
CPC ......... *H04N 19/132* (2014.11); *H04N 19/159* (2014.11); *H04N 19/176* (2014.11); *H04N 19/192* (2014.11); *H04N 19/46* (2014.11); *H04N 19/593* (2014.11)

(58) Field of Classification Search
CPC .... H04N 19/176; H04N 19/192; H04N 19/46; H04N 19/593
USPC ..................................... 375/240.03
See application file for complete search history.

(56) References Cited

FOREIGN PATENT DOCUMENTS

| | | | | |
|---|---|---|---|---|
| KR | 20110002557 A | * | 1/2011 | ............. H04N 19/61 |
| KR | 20130090322 | | 8/2013 | |
| KR | 20140098114 | | 8/2014 | |
| KR | 20150116903 | | 10/2015 | |

* cited by examiner

INTRA PREDICTION METHOD AND APPARATUS FOR VIDEO CODING

CROSS-REFERENCE TO RELATED APPLICATIONS

This application is a National Stage application under 35 U.S.C. § 371 of International Application No. PCT/KR2016/005013, filed on May 12, 2016. The disclosure of the prior application is incorporated by reference in its entirety.

BACKGROUND OF THE INVENTION

Field of the Invention

The present invention relates to a technique for video coding and, more particularly, to a method and apparatus for intra-prediction in a video coding system.

Related Art

Demand for high-resolution, high-quality images such as HD (High Definition) images and UHD (Ultra High Definition) images have been increasing in various fields. As the image data has high resolution and high quality, the amount of information or bits to be transmitted increases relative to the legacy image data. Therefore, when image data is transmitted using a medium such as a conventional wired/wireless broadband line or image data is stored using an existing storage medium, the transmission cost and the storage cost thereof are increased.

Accordingly, there is a need for a highly efficient image compression technique for effectively transmitting, storing, and reproducing information of high resolution and high quality images.

SUMMARY OF THE INVENTION

The present invention provides a method and apparatus for improving intra-prediction efficiency.

The present invention also provides a method and apparatus for generating a prediction sample based on parametric model.

The present invention also provides a method and apparatus for deriving a prediction sample of a current block based on frequency characteristics for a neighboring block.

The present invention also provides a method and apparatus for intra-prediction based on an extrapolation technique.

In an aspect, a method for encoding a picture performed by an encoding device is provided. The encoding method includes selecting $V^{th}$ basis function for a current block according to a specific order among basis functions, deriving $V^{th}$ extension coefficient based on the selected $V^{th}$ basis function, calculating $V^{th}$ weighted error criterion based on the selected $V^{th}$ basis function and the derived $V^{th}$ extension coefficient, and when the $V^{th}$ weighted error criterion value is smaller than a specific threshold value, encoding and outputting information indicating the $V^{th}$ number as a basis number.

In another aspect, a method for decoding a picture performed by a decoding device is provided. The decoding method includes obtaining information indicating a basis number from a bitstream, selecting $V^{th}$ basis function for a current block according to a specific order among basis functions, deriving $V^{th}$ extension coefficient based on the selected $V^{th}$ basis function, checking whether the $V^{th}$ number is equal to the basis number, and when the $V^{th}$ number is equal to the basis number, generating a prediction sample of the current block based on the selected $V^{th}$ basis function and the derived $V^{th}$ extension coefficient.

In still another aspect, an encoding device for performing a picture encoding is provided. The encoding device includes a predictor for selecting $V^{th}$ basis function for a current block according to a specific order among basis functions, deriving $V^{th}$ extension coefficient based on the selected $V^{th}$ basis function, calculating $V^{th}$ weighted error criterion based on the selected $V^{th}$ basis function and the derived $V^{th}$ extension coefficient, and an entropy encoder, when the $V^{th}$ weighted error criterion value is smaller than a specific threshold value, for encoding and outputting information indicating the $V^{th}$ number as a basis number.

In still another aspect, a decoding device for performing a picture decoding is provided. The decoding device includes an entropy decoder for obtaining information indicating a basis number from a bitstream and a predictor for selecting $V^{th}$ basis function for a current block according to a specific order among basis functions, deriving $V^{th}$ extension coefficient based on the selected $V^{th}$ basis function, checking whether the $V^{th}$ number is equal to the basis number, and when the $V^{th}$ number is equal to the basis number, generating a prediction sample of the current block based on the selected $V^{th}$ basis function and the derived $V^{th}$ extension coefficient.

According to the present invention, more accurate intra-prediction of a sample unit may be performed, and accordingly, intra-prediction performance may be significantly improved. In addition, according to the present invention, a computation complexity may be reduced. Through this, an amount of data for a residual signal for a current block may be removed or reduced, and accordingly, overall coding efficiency may be improved.

DESCRIPTION OF EXEMPLARY EMBODIMENTS

Figure 1:
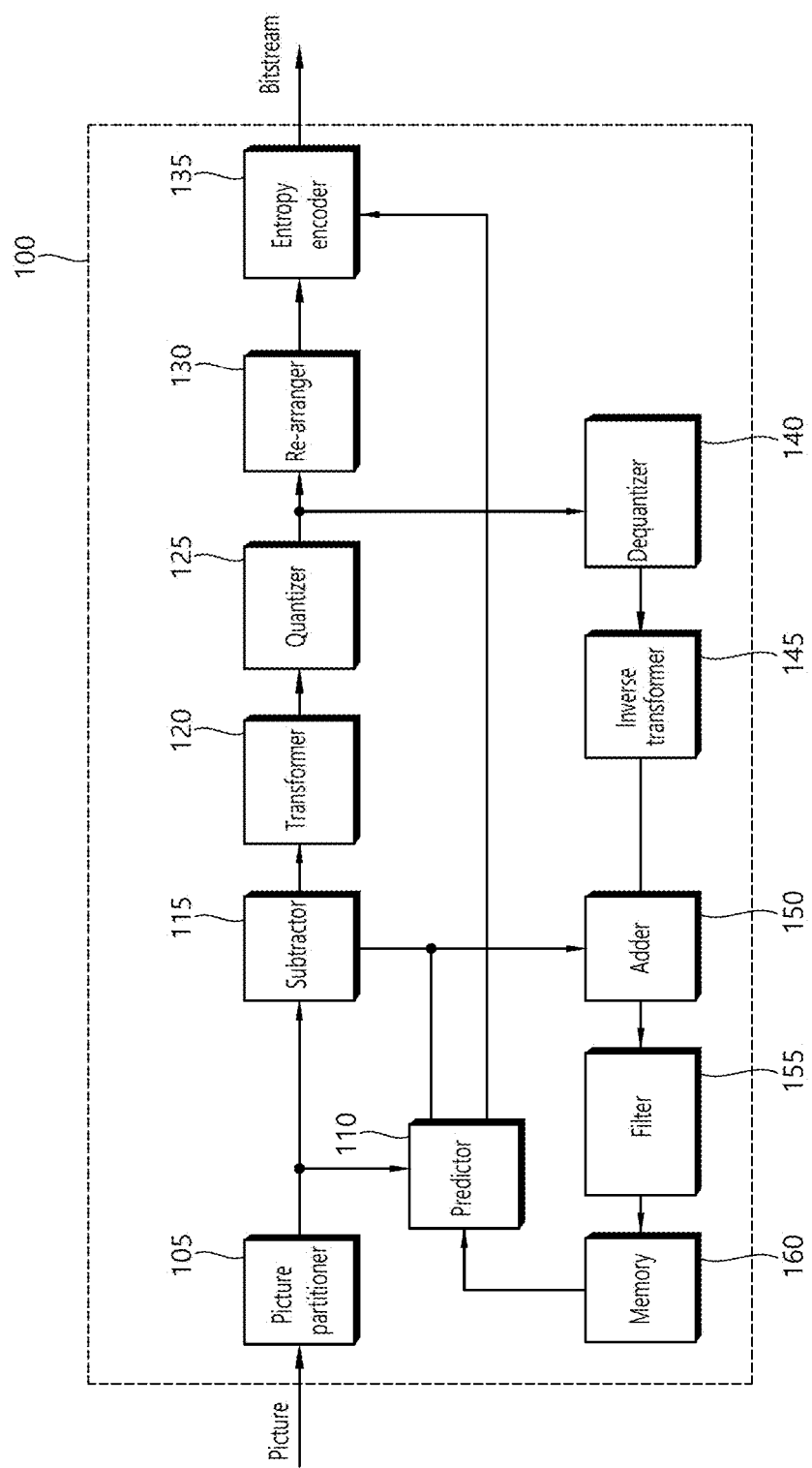
FIG. 1 is a schematic diagram illustrating a configuration of a video encoding device to which the present invention is applicable.

The present invention may be modified in various forms, and specific embodiments thereof will be described and illustrated in the drawings. However, the embodiments are not intended for limiting the invention. The terms used in the following description are used to merely describe specific embodiments, but are not intended to limit the invention. An expression of a singular number includes an expression of the plural number, so long as it is clearly read differently. The terms such as "include" and "have" are intended to indicate that features, numbers, steps, operations, elements, components, or combinations thereof used in the following description exist and it should be thus understood that the possibility of existence or addition of one or more different features, numbers, steps, operations, elements, components, or combinations thereof is not excluded.

On the other hand, elements in the drawings described in the invention are independently drawn for the purpose of convenience for explanation of different specific functions, and do not mean that the elements are embodied by independent hardware or independent software. For example, two or more elements of the elements may be combined to form a single element, or one element may be divided into plural elements. The embodiments in which the elements are combined and/or divided belong to the invention without departing from the concept of the invention.

Hereinafter, embodiments of the present invention will be described in detail with reference to the accompanying drawings. In addition, like reference numerals are used to indicate like elements throughout the drawings, and the same descriptions on the like elements will be omitted.

In the present specification, generally a picture means a unit representing an image at a specific time, a slice is a unit constituting a part of the picture. One picture may be composed of plural slices, and the terms of a picture and a slice may be mixed with each other as occasion demands.

A pixel or a pel may mean a minimum unit constituting one picture (or image). Further, a 'sample' may be used as a term corresponding to a pixel. The sample may generally represent a pixel or a value of a pixel, may represent only a pixel (a pixel value) of a luma component, and may represent only a pixel (a pixel value) of a chroma component.

A unit indicates a basic unit of image processing. The unit may include at least one of a specific area and information related to the area. Optionally, the unit may be mixed with terms such as a block, an area, or the like. In a typical case, an M×N block may represent a set of samples or transform coefficients arranged in M columns and N rows.

FIG. 1 briefly illustrates a structure of a video encoding device to which the present invention is applicable.

Referring to FIG. 1, a video encoding device 100 includes a picture partitioner 105, a predictor 110, a subtractor 115, a transformer 120, a quantizer 125, a re-arranger 130, an entropy encoder 135, a dequantizer 140, an inverse transformer 145, an adder 150, a filter 255, and a memory 160.

The picture partitioner 105 may split an input picture into at least one processing unit. Here, a processing unit may be a coding unit (CU), a prediction unit (PU) or a transform unit (TU). The coding unit is a unit block of coding, and a largest coding unit (LCU) may be split into coding units of deeper depth according to a quad-tree structure. In this case, the largest coding unit may be used as a final coding unit or a coding unit may be recursively split into coding units of deeper depth as necessary and a coding unit having an optimal size may be used as a final coding unit based on coding efficiency according to video characteristics. When a smallest coding unit (SCU) is set, a coding unit cannot be split into a coding unit smaller than the smallest coding unit. Here, the final coding unit refers to a coding unit partitioned or split into a predictor or a transformer. A prediction unit is a block partitioned from a coding unit block and may be a unit block of sample prediction. Here, the prediction unit may be divided into sub blocks. A transform block can be split from a coding unit block according to the quad-tree structure and may be a unit block that derives a transform coefficient and/or a unit block that derives a residual signal from a transform coefficient.

Hereinafter, the coding unit may be called a coding block (CB), the prediction unit may be called a prediction block (PB), and the transform unit may be called a transform block (TB).

The prediction block or the prediction unit may mean a specific area having a block shape in a picture, and may include an array of a prediction sample. Further, the transform block or the transform unit may mean a specific area having a block shape in a picture, and may include a transform coefficient or an array of a residual sample.

The predictor 110 may perform prediction on a processing target block (hereinafter, a current block), and may generate a prediction block including prediction samples for the current block. A unit of prediction performed in the predictor 110 may be a coding block, or may be a transform block, or may be a prediction block.

The predictor 110 may determine whether intra-prediction is applied or inter-prediction is applied to the current block. For example, the predictor 110 may determine whether the intra-prediction or the inter-prediction is applied in unit of CU.

In case of the intra-prediction, the predictor 110 may derive a prediction sample for the current block based on a reference sample outside the current block in a picture to which the current block belongs (hereinafter, a current picture). In this case, the predictor 110 may derive the prediction sample based on an average or interpolation of neighboring reference samples of the current block (case (i)), or may derive the prediction sample based on a reference sample existing in a specific (prediction) direction as to a prediction sample among the neighboring reference samples of the current block (case (ii)). The case (i) may be called a non-directional mode or a non-angular mode, and the case (ii) may be called a directional mode or an angular mode. In the intra-prediction, prediction modes may include as an example 33 directional modes and at least two non-directional modes. The non-directional modes may include DC mode and planar mode. The predictor 110 may determine the prediction mode to be applied to the current block by using the prediction mode applied to the neighboring block.

In case of the inter-prediction, the predictor 110 may derive the prediction sample for the current block based on a sample specified by a motion vector on a reference picture. The predictor 110 may derive the prediction sample for the current block by applying any one of a skip mode, a merge mode, and a motion vector prediction (MVP) mode. In case of the skip mode and the merge mode, the predictor 110 may use motion information of the neighboring block as motion information of the current block. In case of the skip mode, unlike in the merge mode, a difference (residual) between the prediction sample and an original sample is not transmitted. In case of the MVP mode, a motion vector of the neighboring block is used as a motion vector predictor and thus is used as a motion vector predictor of the current block to derive a motion vector of the current block.

In case of the inter-prediction, the neighboring block may include a spatial neighboring block existing in the current picture and a temporal neighboring block existing in the reference picture. The reference picture including the temporal neighboring block may also be called a collocated picture (colPic). Motion information may include the motion vector and a reference picture index. Information such as prediction mode information and motion information may be (entropy) encoded, and then output as a form of a bitstream.

When motion information of a temporal neighboring block is used in the skip mode and the merge mode, a highest picture in a reference picture list may be used as a reference picture. Reference pictures included in the reference picture list may be aligned based on a picture order count (POC) difference between a current picture and a corresponding reference picture. A POC corresponds to a display order and can be discriminated from a coding order.

The subtractor 115 generates a residual sample which is a difference between an original sample and a prediction sample. If the skip mode is applied, the residual sample may not be generated as described above.

The transformer 120 transforms residual samples in units of a transform block to generate a transform coefficient. The transformer 120 may perform transformation based on the size of a corresponding transform block and a prediction mode applied to a coding block or prediction block spatially overlapping with the transform block. For example, residual samples can be transformed using discrete sine transform (DST) if intra-prediction is applied to the coding block or the prediction block overlapping with the transform block and the transform block is a 4×4 residual array and is transformed using discrete cosine transform (DCT) in other cases.

The quantizer 125 may quantize the transform coefficients to generate a quantized transform coefficient.

The re-arranger 130 rearranges quantized transform coefficients. The re-arranger 130 may rearrange the quantized transform coefficients in the form of a block into a one-dimensional vector through a coefficient scanning method. Although the re-arranger 130 is described as a separate component, the re-arranger 130 may be a part of the quantizer 125.

The entropy encoder 135 may perform entropy-encoding on the quantized transform coefficients. The entropy encoding may include an encoding method, for example, an exponential Golomb, a context-adaptive variable length coding (CAVLC), a context-adaptive binary arithmetic coding (CABAC), or the like. The entropy encoder 135 may perform encoding together or separately on information (e.g., a syntax element value or the like) required for video reconstruction in addition to the quantized transform coefficients. The entropy-encoded information may be transmitted or stored in unit of a network abstraction layer (NAL) in a bitstream form.

The dequantizer 140 dequantizes values (transform coefficients) quantized by the quantizer 125 and the inverse transformer 145 inversely transforms values dequantized by the dequantizer 135 to generate a residual sample.

The adder 150 adds a residual sample to a prediction sample to reconstruct a picture. The residual sample may be added to the prediction sample in units of a block to generate a reconstructed block. Although the adder 150 is described as a separate component, the adder 150 may be a part of the predictor 110.

The filter 155 may apply deblocking filtering and/or a sample adaptive offset to the reconstructed picture. Artifacts at a block boundary in the reconstructed picture or distortion in quantization can be corrected through deblocking filtering and/or sample adaptive offset. Sample adaptive offset may be applied in units of a sample after deblocking filtering is completed. The filter 155 may apply an adaptive loop filter (ALF) to the reconstructed picture. The ALF may be applied to the reconstructed picture to which deblocking filtering and/or sample adaptive offset has been applied.

The memory 160 may store a reconstructed picture or information necessary for encoding/decoding. Here, the reconstructed picture may be the reconstructed picture filtered by the filter 155. The stored reconstructed picture may be used as a reference picture for (inter) prediction of other pictures. For example, the memory 160 may store (reference) pictures used for inter-prediction. Here, pictures used for inter-prediction may be designated according to a reference picture set or a reference picture list.

Figure 2:
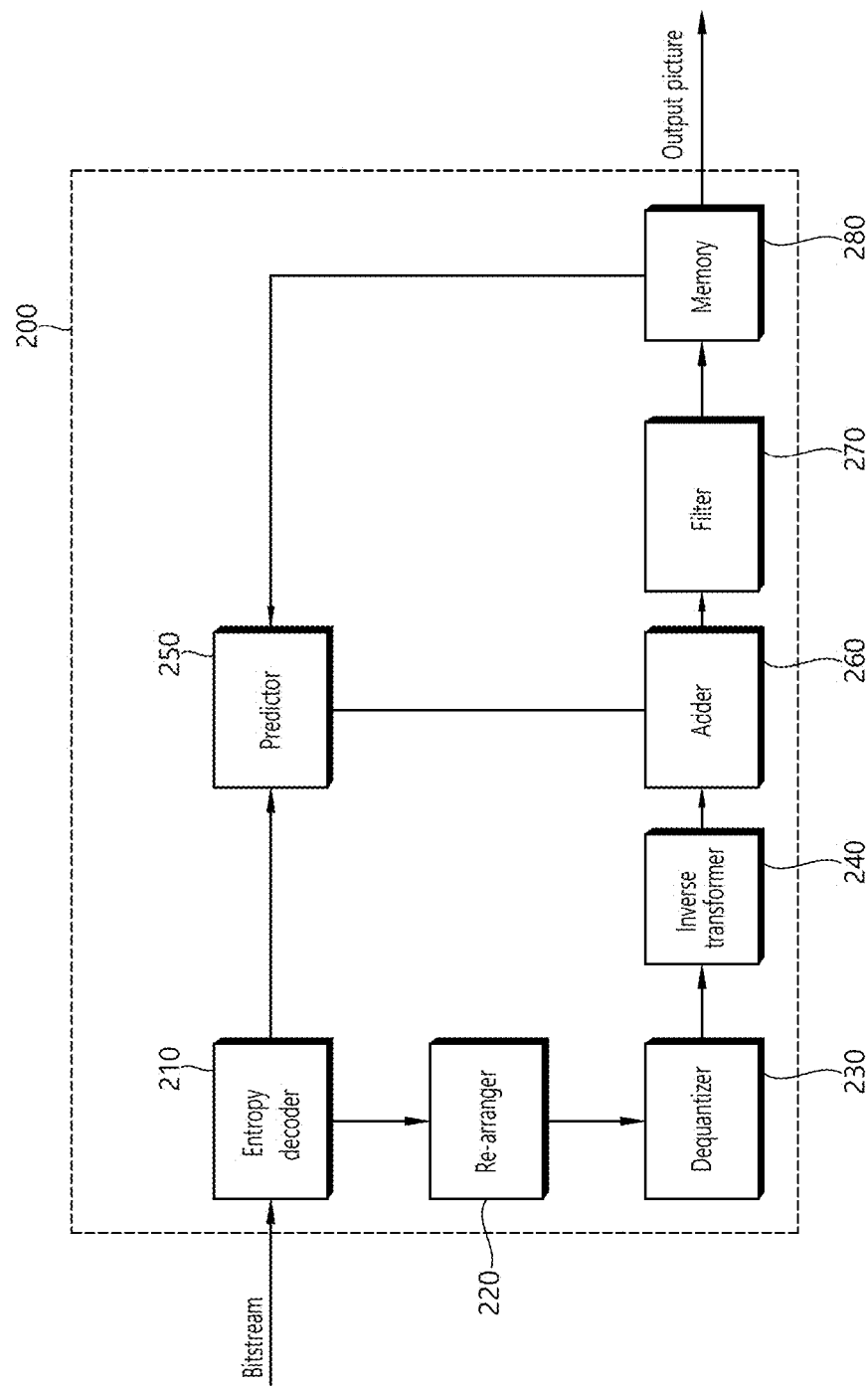
FIG. 2 is a schematic diagram illustrating a configuration of a video decoding device to which the present invention is applicable.

FIG. 2 briefly illustrates a structure of a video decoding device to which the present invention is applicable.

Referring to FIG. 2, a video decoding device 200 includes an entropy decoder 210, a re-arranger 220, a dequantizer 230, an inverse transformer 240, a predictor 250, an adder 260, a filter 270, and a memory 280.

When a bitstream including video information is input, the video decoding device 200 may reconstruct a video in association with a process by which video information is processed in the video encoding device.

For example, the video decoding device 200 may perform video decoding by using a processing unit applied in the video encoding device. Therefore, the processing unit block of video decoding may be a coding unit block, a prediction unit block, or a transform unit block. As a unit block of decoding, the coding unit block may be split according to a quad tree structure from a largest coding unit block. As a block partitioned from the coding unit block, the prediction unit block may be a unit block of sample prediction. In this case, the prediction unit block may be divided into sub blocks. As a coding unit block, the transform unit block may be split according to the quad tree structure, and may be a unit block for deriving a transform coefficient or a unit block for deriving a residual signal from the transform coefficient.

The entropy decoder 210 may parse the bitstream to output information required for video reconstruction or picture reconstruction. For example, the entropy decoder 210 may decode information in the bitstream based on a coding method such as exponential Golomb encoding, CAVLC, CABAC, or the like, and may output a value of a syntax element required for video reconstruction and a quantized value of a transform coefficient regarding a residual.

More specifically, a CABAC entropy decoding method can receive a bin corresponding to each syntax element in a bitstream, determine a context model using decoding target syntax element information and decoding information of neighboring and decoding target blocks or information of amabol/bin decoded in a previous step, predict bin generation probability according to the determined context model and perform arithmetic decoding of the bin to generate a symbol corresponding to each syntax element value. Here, the CABAC entropy decoding method can update the context model using information of a symbol/bin decoded for a context model of the next symbol/bin after determination of the context model.

Information about prediction among information decoded in the entropy decoder 210 may be provided to the predictor

250 and residual values, that is, quantized transform coefficients, on which entropy decoding has been performed by the entropy decoder 210 may be input to the re-arranger 220.

The re-arranger 220 may rearrange the quantized transform coefficients into a two-dimensional block form. The re-arranger 220 may perform rearrangement corresponding to coefficient scanning performed by the encoding device. Although the re-arranger 220 is described as a separate component, the re-arranger 220 may be a part of the quantizer 230.

The dequantizer 230 may de-quantize the quantized transform coefficients based on a (de)quantization parameter to output a transform coefficient. In this case, information for deriving a quantization parameter may be signaled from the encoding device.

The inverse transformer 240 may inverse-transform the transform coefficients to derive residual samples.

The predictor 250 may perform prediction on a current block, and may generate a prediction block including prediction samples for the current block. A unit of prediction performed in the predictor 250 may be a coding block or may be a transform block or may be a prediction block.

The predictor 250 may determine whether to apply intra-prediction or inter-prediction based on information on a prediction. In this case, a unit for determining which one will be used between the intra-prediction and the inter-prediction may be different from a unit for generating a prediction sample. In addition, a unit for generating the prediction sample may also be different in the inter-prediction and the intra-prediction. For example, which one will be applied between the inter-prediction and the intra-prediction may be determined in unit of CU. Further, for example, in the inter-prediction, the prediction sample may be generated by determining the prediction mode in unit of PU, and in the intra-prediction, the prediction sample may be generated in unit of TU by determining the prediction mode in unit of PU.

In case of the intra-prediction, the predictor 250 may derive a prediction sample for a current block based on a neighboring reference sample in a current picture. The predictor 250 may derive the prediction sample for the current block by applying a directional mode or a non-directional mode based on the neighboring reference sample of the current block. In this case, a prediction mode to be applied to the current block may be determined by using an intra-prediction mode of a neighboring block.

In the case of inter-prediction, the predictor 250 may derive a prediction sample for a current block based on a sample specified in a reference picture according to a motion vector. The predictor 250 may derive the prediction sample for the current block using one of the skip mode, the merge mode and the MVP mode. Here, motion information required for inter-prediction of the current block provided by the video encoding device, for example, a motion vector and information about a reference picture index may be acquired or derived based on the information about prediction.

In the skip mode and the merge mode, motion information of a neighboring block may be used as motion information of the current block. Here, the neighboring block may include a spatial neighboring block and a temporal neighboring block.

The predictor 250 may construct a merge candidate list using motion information of available neighboring blocks and use information indicated by a merge index on the merge candidate list as a motion vector of the current block. The merge index may be signaled by the encoding device. Motion information may include a motion vector and a reference picture. When motion information of a temporal neighboring block is used in the skip mode and the merge mode, a highest picture in a reference picture list may be used as a reference picture.

In the case of the skip mode, a difference (residual) between a prediction sample and an original sample is not transmitted, distinguished from the merge mode.

In the case of the MVP mode, the motion vector of the current block may be derived using a motion vector of a neighboring block as a motion vector predictor. Here, the neighboring block may include a spatial neighboring block and a temporal neighboring block.

When the merge mode is applied, for example, a merge candidate list can be generated using a motion vector of a reconstructed spatial neighboring block and/or a motion vector corresponding to a Col block which is a temporal neighboring block. A motion vector of a candidate block selected from the merge candidate list is used as the motion vector of the current block in the merge mode. The aforementioned information about prediction may include a merge index indicating a candidate block having the best motion vector selected from candidate blocks included in the merge candidate list. Here, the predictor 250 may derive the motion vector of the current block using the merge index.

When the MVP (Motion vector Prediction) mode is applied as another example, a motion vector predictor candidate list may be generated using a motion vector of a reconstructed spatial neighboring block and/or a motion vector corresponding to a Col block which is a temporal neighboring block. That is, the motion vector of the reconstructed spatial neighboring block and/or the motion vector corresponding to the Col block which is the temporal neighboring block may be used as motion vector candidates. The aforementioned information about prediction may include a prediction motion vector index indicating the best motion vector selected from motion vector candidates included in the list. Here, the predictor 250 may select a prediction motion vector of the current block from the motion vector candidates included in the motion vector candidate list using the motion vector index. The predictor of the encoding device may obtain a motion vector difference (MVD) between the motion vector of the current block and a motion vector predictor, encode the MVD and output the encoded MVD in the form of a bitstream. That is, the MVD can be obtained by subtracting the motion vector predictor from the motion vector of the current block. Here, the predictor 250 may acquire a motion vector included in the information about prediction and derive the motion vector of the current block by adding the motion vector difference to the motion vector predictor. In addition, the predictor may obtain or derive a reference picture index indicating a reference picture from the aforementioned information about prediction.

The adder 260 can add a residual sample to a prediction sample to reconstruct a current block or a current picture. The adder 260 may reconstruct the current picture by adding the residual sample to the prediction sample in units of a block. When the skip mode is applied, a residual is not transmitted and thus the prediction sample may become a reconstructed sample. Although the adder 260 is described as a separate component, the adder 260 may be a part of the predictor 250.

The filter 270 may apply deblocking filtering, sample adaptive offset and/or ALF to the reconstructed picture. Here, sample adaptive offset may be applied in units of a sample after deblocking filtering. The ALF may be applied after deblocking filtering and/or application of sample adaptive offset.

The memory 280 may store a reconstructed picture or information necessary for decoding. Here, the reconstructed picture may be the reconstructed picture filtered by the filter 270. For example, the memory 280 may store pictures used for inter-prediction. Here, the pictures used for inter-prediction may be designated according to a reference picture set or a reference picture list. A reconstructed picture may be used as a reference picture for other pictures. The memory 280 may output reconstructed pictures in an output order.

In the digital image processing field, as a technique of processing and coding absent image information using information constructed (or decoded) neighboring area in a picture, an extrapolation technique may be used. As an example, in the case that a picture is encoded and transmitted, a decoding device may be unable to reconstruct a whole picture owing to a communication state and the like. That is, a part of sample in a picture may not be properly reconstructed. A decoding device may reconstruct a sample by processing an error autonomously, and in this case, the decoding device may generate a substitution sample by applying the extrapolation technique using the information of the neighboring area which is already reconstructed. As another example, an intra-prediction method among image coding techniques may be known as a sort of the extrapolation technique. The decoding device may generate a prediction sample using the information of a neighboring area already reconstructed or a sample, and generate a reconstruction sample by receiving a residual signal that compensate the prediction sample, and accordingly, reconstruct a picture.

Generally, according to the extrapolation technique, a target sample may be predicted and reconstructed based on neighboring sample information in a spatial domain. The extrapolation technique is characterized that prediction accuracy is relatively low, but the complexity is low. According to the present invention, by using a linear combination of the sample information of a neighboring area reconstructed already and a basis function of a frequency domain, the extrapolation technique may be performed by generating a parametric model, and through this, an intra-prediction performance may be significantly improved.

Figure 3:
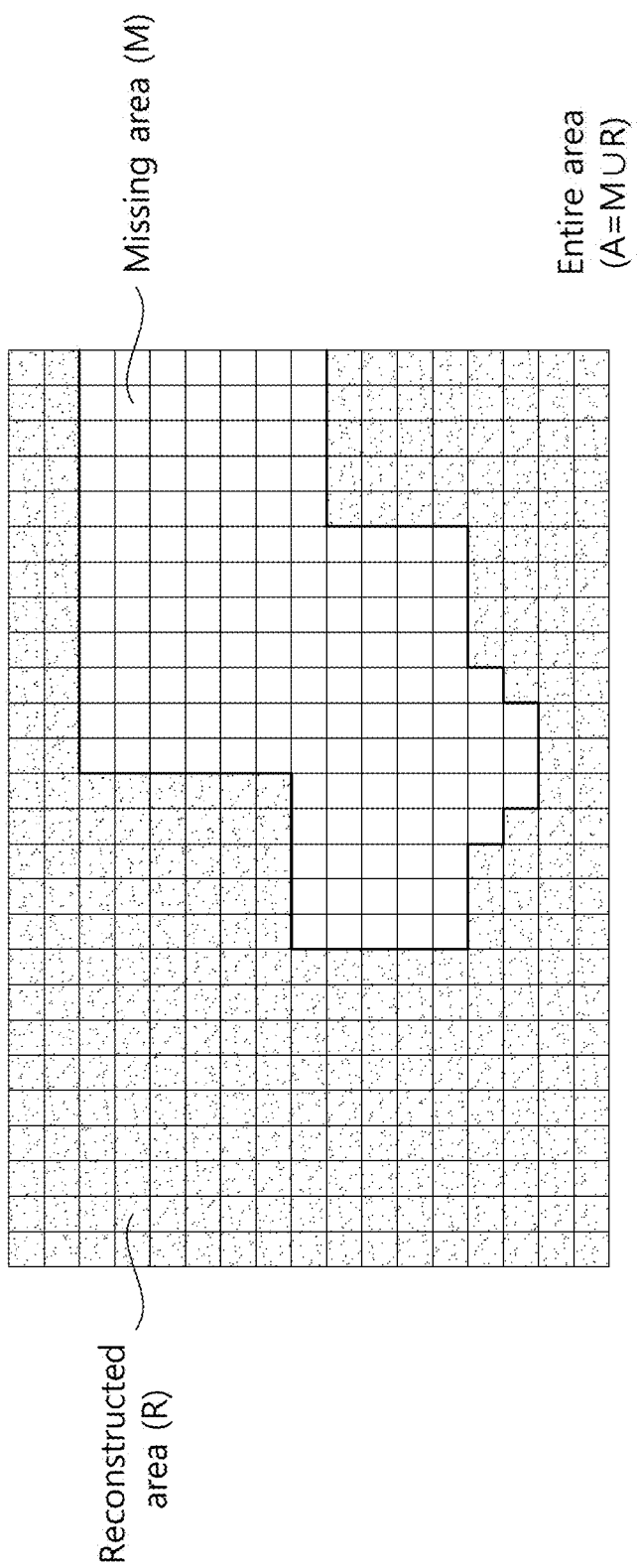
FIG. 3 illustrates a reconstructed area and a non-reconstructed area of a picture for applying the extrapolation technique as an example.

FIG. 3 illustrates a reconstructed area and a non-reconstructed area of a picture for applying the extrapolation technique as an example.

Referring to FIG. 3, a picture includes a reconstructed area R and a missing area M. The whole are A may be represented by a union of the reconstructed area R and the missing area M. Here, the reconstructed area R includes a reconstructed sample, but the missing area M does not includes a reconstructed sample. That is, in the missing area, the information of the reconstructed samples is still not existed. According to the present invention, based on the information of the reconstructed area R, a method of prediction and reconstruction is provided. In this case, in order to apply the extrapolation technique, the property of a basis function may be used. For example, the neighboring reconstructed area R includes reconstructed samples, and the reconstructed samples may be obtained based on prediction samples and a residual signal. The residual signal may represent residual samples corresponding to each coordinate. An encoding device may derive the residual samples based on an original sample and prediction samples, and the residual samples may be transformed to a frequency domain based on a format of a residual signal in a block unit (e.g., TU or TB), and transmitted to the decoding device after going through a quantization process. In this case, the decoding device may derive the residual samples by processing a dequantization and an inverse transform in a block unit. For performing transform/inverse transform such residual samples, discrete cosine transform (DCT), discrete sine transform (DST), discrete Fourier transform (DFT) or the like is used, and in this case, it may be changed whether to apply the DCT, the DST, the DFT or the like depending on a size of a corresponding block. For example, the corresponding block may have a size of 64×64, 32×32, 16×16, 8×8, 4×4, and the like. In the case that the block size is 4×4, the residual samples in the corresponding block may be transformed using the DST, and otherwise, the residual samples may be transformed using the DCT or the DFT. Since the basis function such as the DCT, the DST, the DFT, or the like has a periodic feature, the basis function is beneficial for an extension of signal, and accordingly, in the case that samples in the missing area are predicted using the property of the basis function, the prediction efficiency may be increased.

For example, when is denoted that a row direction index of a picture or a predetermined area is m and a column direction index is n, the reconstruction samples in the reconstructed area R may be represented by a function f[m, n] of n and m. In addition, when it is denoted that a parametric model that may represent the whole area A, derived by performing an approximation based on the reconstructed area R is g[m, n], the parametric model g[m, n] may be represented as the following Equation as a linear combination of a basis function $\varphi_{k,l}[m, n]$ and its extension coefficient $c_{k,l}$.

$$g[m, n] = \sum_{(k,l) \in K} c_{k,l} \varphi_{k,l}[m, n] \qquad \text{[Equation 1]}$$

Herein, K is a set of the basis functions used in the parametric mode, and (k, l) is an index indicating the basis function used in the K set. The (k, l) may indicate indexes of the basis functions that correspond to the respective coordinates in 2D space area. In this case, the number of usable basis functions may be the same as a size of the whole area A. That is, K may be a set of up to M×N the basis functions.

In this case, in order to determine the extension coefficient, it may be defined an error criterion that minimizes an error between an original signal for the reconstructed area R or a reconstructed signal and a parametric signal. In this case, in order to emphasize the reconstructed area R, a weighted function w[m, n] may be used, and the weighted function may be defined as below.

$$w[m, n] = \begin{cases} \rho[m, n] & (m, n) \in R \\ 0, & (m, n) \in M \end{cases} \qquad \text{[Equation 2]}$$

Herein, ρ is designated for indicating a weighted value for emphasizing a pixel neighboring a missing area R in a target area or a support area, and the weighted value may be predetermined or an index may be signaled, which indicates one of several predefined values, or the weighted value itself may be signaled.

Based on the Equation, a weighted error criterion $E_A$ for a reconstructed area R may be represented as the following Equation.

$$E_A = \sum_{(m,n) \in A} w[m,n](f[m,n] - g[m,n])^2 \quad \text{[Equation 3]}$$

In the equation, the weighted function part emphasizes a partial area neighboring the missing area M among the reconstructed area R, and accordingly, the accuracy in the extrapolation technique may be increased.

In addition, the weighted error criterion $E_A$ may be minimized by defining a partial derivative for an unknown coefficient to zero as below.

$$\frac{\partial E_A}{\partial c_{k,l}} = 0 \quad \text{[Equation 4]}$$

In order to derive an optimized parametric model, it is needed to select basis functions and to determine an extension coefficient for each basis function. In order to determine a basis function and an extension coefficient thereof, a successive approximation through iteration may be used. In this case, candidate basis functions are selected first, and extension coefficients are searched iteratively in an aspect of minimizing the weighted error criterion, and accordingly, the approximation may be performed.

The method of determining an extension coefficient using the successive approximation may include the followings. For example, a parametric model for $V^{th}$ iteration may be represented as below.

$$g^{(V)}[m,n] = \sum_{(k,l) \in K_V} c_{k,l}^{(V)} \varphi_{k,l}[m,n] \quad \text{[Equation 5]}$$

Herein, $K_v$ is a set of the basis functions used in $V^{th}$ iteration. $K_v$ is empty when V=0, and may be defined as an initial value for an iteration of the parametric model, that is, $g^{(0)}[m,n]=0$.

In this case, a window function may be defined as below.

$$b[m,n] = \begin{cases} 1, & (m,n) \in R \\ 0, & (m,n) \in M \end{cases} \quad \text{[Equation 6]}$$

Based on the window function, a residual error signal for a reconstructed area R may be defined as below.

$$r^{(V)}[m,n] = (f[m,n] - g^{(V)}[m,n]) \cdot b[m,n] \quad \text{[Equation 7]}$$

With respect to $u^{th}$ and $v^{th}$ basis function circulated or considered in $v^{th}$ iteration among the entire basis functions, when a coefficient update of $V+1^{th}$ iteration is performed, an equation of the residual error signal may be represented as below.

$$r^{(V+1)}[m,n] = (r^{(V)}[m,n] - \Delta c \varphi_{u,v}[m,n]) \cdot b[m,n] \quad \text{[Equation 8]}$$

Here, in order to obtain an extension coefficient variation $\Delta c$, the weighted error criterion defined above may be used. In this case, the weighted error criterion for $V+1^{th}$ iteration may be represented as below.

$$E_A^{(V+1)} = \sum_{(m,n) \in L} w[m,n](r^{(V)}[m,n] - \Delta c \varphi_{u,v}[m,n])^2 \quad \text{[Equation 9]}$$

Using the fact that a weighted function for a reconstructed area R is b[m,n]w[m,n]=w[m,n] when an error is minimized, the extension coefficient variation may be derived as below.

$$\Delta c = \frac{\sum_{(m,n) \in L} w[m,n] r^{(V)}[m,n] \varphi_{u,v}[m,n]}{\sum_{(m,n) \in L} w[m,n] \varphi_{u,v}^2[m,n]} \quad \text{[Equation 10]}$$

Accordingly, in this case, with respect to basis function $\varphi_{u,v}[m,n]$, the $V+1^{th}$ extension coefficient may be defined as $c^{(V+1)}_{u,v} = c^{(V)}_{u,v} + \Delta c$, and a set of the basis functions which are used may also be updated to $K_{v+1} = K_v \cup \{u, v\}$ if (u, v) $\notin K_v$.

Based on this, a proper basis function may be selected by using the equation of the residual error signal defined above and the equations for iteration approximation. In this case, using the following equation, it may be known that a residual error signal r(v)[m,n] and the selected basis function are orthogonal.

$$\sum_{(m,n) \in L} w[m,n](r^{(V+1)}[m,n])^2 = \quad \text{[Equation 11]}$$
$$\sum_{(m,n) \in L} w[m,n](r^{(V)}[m,n])^2 - \sum_{(m,n) \in L} w[m,n](\Delta c \varphi_{u,v}[m,n])^2$$

With respect to the second term in the right side of Equation 11, when the weighted error criterion is applied, the equation for selecting a basis function that reduces an error using Equation 1o above to the maximum may be derived as below.

$$\Delta E_A^{(V)} = \Delta c^2 \sum_{(m,n) \in L} w[m,n](\varphi_{u,v}[m,n])^2 = \quad \text{[Equation 12]}$$
$$\frac{\left(\sum_{(m,n) \in L} w[m,n] r^{(V)}[m,n] \varphi_{u,v}[m,n]\right)^2}{\sum_{(m,n) \in L} w[m,n](\varphi_{u,v}[m,n])^2}$$

$$(u,v) = \arg\max_{(k,l)} \Delta E_A^{(V)} \quad \text{[Equation 13]}$$

Here, likewise in the coefficient update described above, it is defined as an initial value for an iteration of the parametric model, that is, $g^{(0)}[m,n]=0$. Further, the iteration may be performed until the weighted error criterion $\Delta E^{(V)}_A$ becomes smaller than a predefined threshold value $\Delta E_{min}$. The threshold value $\Delta E_{min}$ may be predefined by a user.

That is, through the iteration, the basis function and the extension coefficient when the weighted error criterion $\Delta E^{(V)}_A$ becomes smaller than a predefined threshold value $\Delta E_{min}$ may be used as an input value of the parametric model of Equation 5 above, and based on the output value of the parametric model, a prediction sample and/or a reconstructed sample for the missing area M may be derived.

The algorithm of the extrapolation technique using the parametric model according to the present invention described above is arranged briefly as below.

Figure 4:
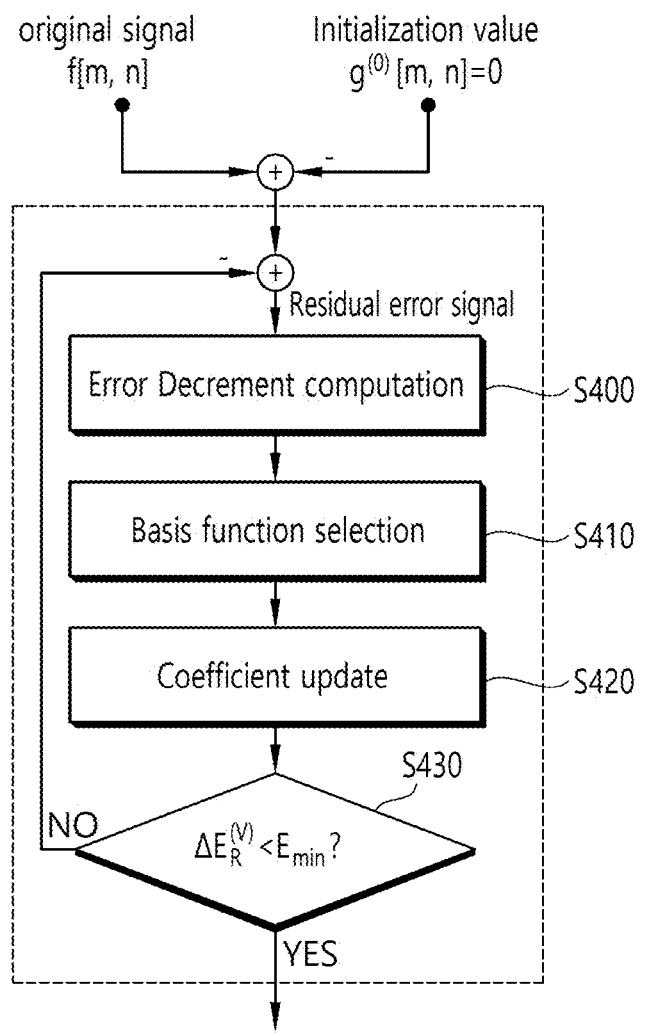
FIG. 4 schematically illustrates algorithm of the extrapolation technique using a parametric model according to the present invention.

FIG. 4 schematically illustrates algorithm of the extrapolation technique using a parametric model according to the present invention.

Referring to FIG. 4, an image processing device performs an error decrement computation based on an original signal f[m,n] and an initial value $g^{(0)}[m,n]=0$ as an input signal (step, S400). In this case, an equation for a residual error signal is derived based on the input signal, and based on this, the weighted error based decrement computation may be performed.

The image processing device selects a basis function (step, S410). The image processing device may select the basis function according to a predetermined range and a predetermined order among basis functions.

The image processing device performs a coefficient update (step, S420). Here, the coefficient update includes a coefficient update for the extension coefficient described above. The image processing device performs the coefficient update based on the selected basis function, and determines an extension coefficient.

The image processing device calculates the weighted error criterion of $V^{th}$ iteration (i.e., $V^{th}$ index) based on the basis function and the extension coefficient, and checks whether the calculated weighted error criterion is smaller than the threshold value $\Delta E_{min}$ (step, S430). In this case, the weighted error criterion may be calculated for the whole or a predefined reconstructed area in the current picture.

In the case that the weighted error criterion is smaller than the threshold value, the image processing device derives a parametric model based on the basis function and the extension coefficient, and derives prediction samples based on the derived parametric model.

In the case that the weighted error criterion is not smaller than the threshold value, a coding device adds 1 to the index V, and iterates the procedures described above.

Meanwhile, a maximum iteration count may be predetermined, and in this case, the image processing device may terminate the procedure when V reaches the maximum iteration count, and derive the parametric model based on the basis function and the extension coefficient for the weighted error criterion having a minimum value or the last weighted error criterion among the calculated weighted error criteria.

Although the procedures such as the error decrement computation process, the basis function selection and the coefficient update, and the weighted error criterion comparison are separately shown in FIG. 4, this is just an example for description. All of the procedures such as the basis function selection and the coefficient update, and the weighted error criterion comparison may be included in the error decrement computation process.

According to the method described above, the extrapolation technique using the parametric model constructed by basis functions and the linear combination of the extension coefficients thereof may be applied to a video encoding/decoding procedure. In the intra-coding method among general video coding methods, when a prediction signal is generated, the extrapolation technique may be performed using neighboring samples. That is, in the case that the intra-prediction is applied, a prediction sample may be derived by using neighboring samples of a current block. The present invention proposes a method for performing more accurate intra-prediction through the extrapolation technique using the parametric model described above when performing the intra-prediction.

When performing a general intra-coding, a prediction signal may be generated by copying neighboring samples already decoded according to a predefined direction, performing a linear interpolation or using an average value of neighboring samples. For example, in the case that the intra-prediction mode is a directional mode, a prediction sample may be generated using a neighboring sample of a specific prediction direction. In the case that the intra-prediction mode is a planar mode among non-directional modes, a prediction sample may be generated through a bi-directional interpolation of neighboring 4 samples, and in the case that the intra-prediction mode is a DC mode among non-directional modes, a prediction sample may be generated using an average value of neighboring samples. Accordingly, it may be said that the intra-prediction mode is based on the extrapolation technique in a spatial domain (or pixel domain), generally. According to the present invention, the parametric model using the basis function and the extension coefficient used for a frequency transform of a residual signal is combined with the conventional intra-prediction method, and accordingly, more accurate intra-prediction may be performed using small amount of computation.

According to the method for deriving the parametric model described above, at least one basis function is selected, and in order to define an extension coefficient for each basis function, iteration is performed until a predetermined criterion is satisfied. Here, the predetermined criterion may mean the case that the weighted error criterion is smaller than $E_{min}$ as described above in FIG. 4, otherwise, mean the weighted error criterion of reaching a predetermined maximum iteration count. When the method is applied to the intra-coding method without any change, an encoding device may measure residual error energy through an original signal, but an accurate measurement is impossible for a decoding device. In addition, even in the case that residual error energy is measured using neighboring reconstructed sample, it may not be proper for a decoding device to apply the iteration method that requires large amount of computation depending on an application. Accordingly, a method is proposed for increasing prediction efficiency while reducing amount of computation as below.

As an example, according to the present invention, the considered basis functions may be restricted based on a prediction direction of an intra-prediction mode. That is, an extension coefficient may be obtained by sorting prediction directions of a current block, which is a coding target block, and selecting only the basis functions that have great relationship with the corresponding prediction direction. In this case, processing complexity in a decoding device may be reduced.

In this case, the used prediction direction may include a horizontal direction, a vertical direction and a diagonal direction. Here, the diagonal direction may include at least one of upper-right diagonal direction, upper-left diagonal direction and lower-left diagonal direction. In this case, for example, a plurality of directional modes may be classified into a horizontal direction mode, a vertical direction mode and a diagonal direction mode according to the similarity. Or, as another example, the intra-prediction based on the parametric model is applied only in the case that the intra-prediction mode of a current block is an intra-prediction mode including a horizontal direction, a vertical direction and a diagonal direction.

According to this embodiment, an intra-prediction mode having a prediction direction of smallest error may be determined, and basis functions in relation to the prediction direction of the determined intra-prediction mode may be restricted. For example, in the case that the intra-prediction mode of a current block is classified as a horizontal mode, it may be restricted to the basis functions in which the basis functions as shown in the drawing are considered.

Figure 5:
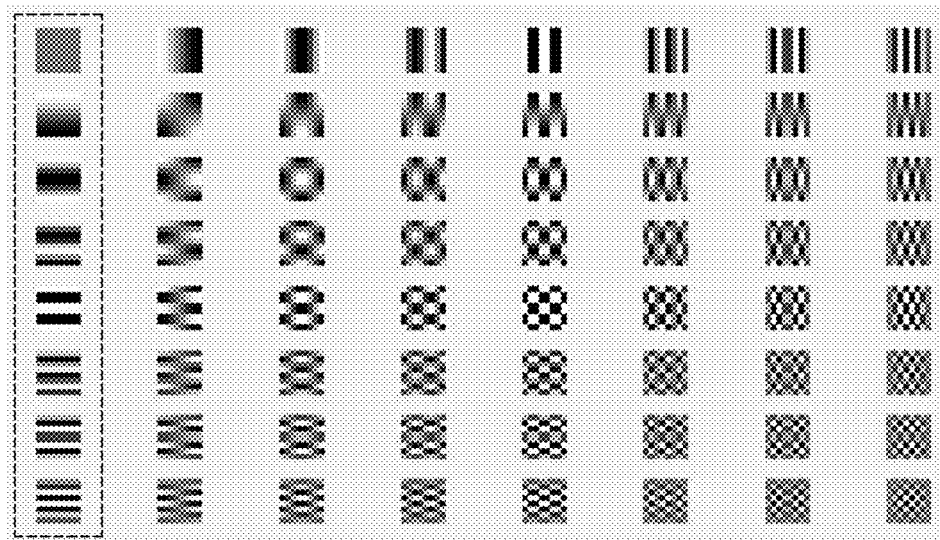
FIG. 5 illustrates an example of a restriction of basis functions according to the present invention.

FIG. 5 illustrates an example of a restriction of basis functions according to the present invention. FIG. 5 shows the example that the basis functions having a horizontal direction property are selected among the basis functions for a block of 8×8 size based on DCT.

Referring to FIG. 5, in the case that the intra-prediction mode of a current block is classified as a horizontal mode, for deriving a parametric model, only the basis functions in relation to the horizontal direction located in the left bock may be considered. That is, the basis functions having the horizontal directional property a shown in the left side of FIG. 5 may be used for deriving the parametric model of the current block classified as the horizontal mode. In this case, the remaining basis functions may be excluded from the iteration process for deriving the parametric model.

As such, an approximation is performed by determining so as to use the basis functions related to a specific prediction direction, and an extension coefficient is approximated only for the determined basis functions, and accordingly, the amount of computation required for iteration for determining the basis function and the extension coefficient may be significantly reduced.

Meanwhile, as another example, a scan or search order of the basis functions considered based on a prediction direction of an intra-prediction mode may be determined. That is, an extension coefficient may be obtained by considering the basis functions that have great relationship with the prediction direction of the current block preferentially. In this case, a processing complexity in a decoding device may be decreased.

In this case, the used prediction direction may include a horizontal direction, a vertical direction and a diagonal direction as described above. Here, the diagonal direction may include at least one of upper-right diagonal direction, upper-left diagonal direction and lower-left diagonal direction, as described above.

According to this embodiment, the intra-prediction mode that has a prediction direction having smallest error is determined, and the basis functions that have great relationship with the prediction direction of the determined intra-prediction mode may be selected first according to a priority. In this case, through the iteration of small number, the case that the weighted error criterion is smaller than $E_{min}$ may be derived, and based on this, a parametric model may be derived. For example, when the intra-prediction mode of a current block is classified as a horizontal mode, as shown in the drawing below, the basis functions in relation to the horizontal direction may be scanned or searched first.

Figure 6:
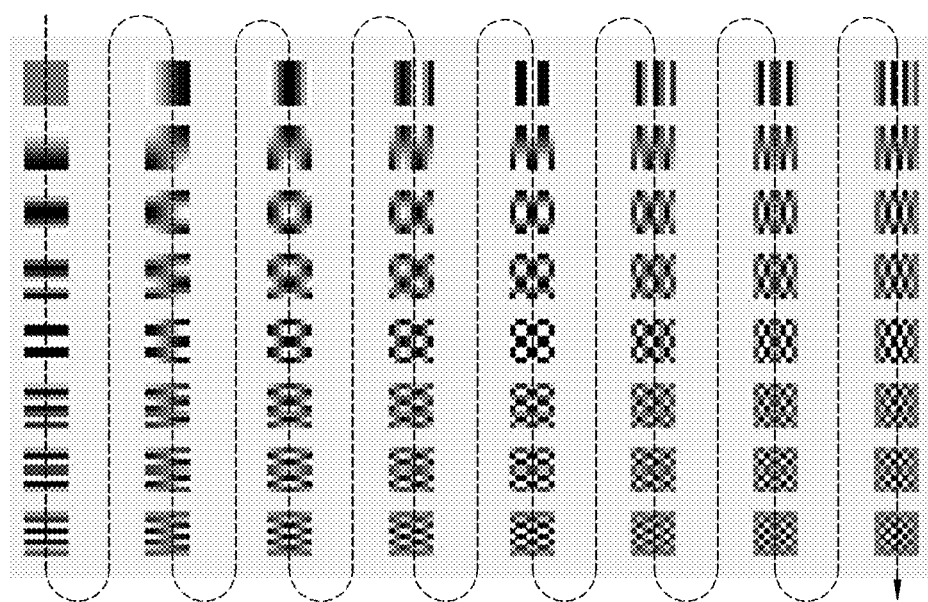
FIG. 6 illustrates an example of a search order of basis functions according to the present invention.

FIG. 6 illustrates an example of a search order of basis functions according to the present invention. FIG. 6 shows an example that the basis functions having the horizontal direction property are preferentially searched among the basis functions for an 8×8 size block based on DCT.

Referring to FIG. 6, in the case that the intra-prediction mode of a current block is classified as a horizontal mode, in order to derive a parametric model, the basis functions having the horizontal direction property may be preferentially searched. In this case, priority indexes may be added to the basis functions according to the direction properties, and searched according to the priority. That is, as shown in the left side in FIG. 6, the basis functions having the horizontal direction property may be preferentially used for deriving the parametric model of the current block classified as the horizontal mode.

As such, an approximation is performed by determining so as to use the basis functions in relation to a specific prediction direction first, and the extension coefficient for each of the basis functions may be approximated. In this case, the basis function in relation to a proper direction may be preferentially searched, and in this case, through a small number of iteration, the case may be derived that the weighted error criterion described above is smaller than $E_{min}$, and based on this, a parametric model may be derived. In addition, in this case, by limiting the maximum number of the basis functions considered as described above, the computation complexity may be further reduced. In this case, the maximum number of the basis functions considered may be predefined or signaled, for example. In this case, the maximum number of the basis functions considered may be changed according to a prediction direction.

Figure 7:
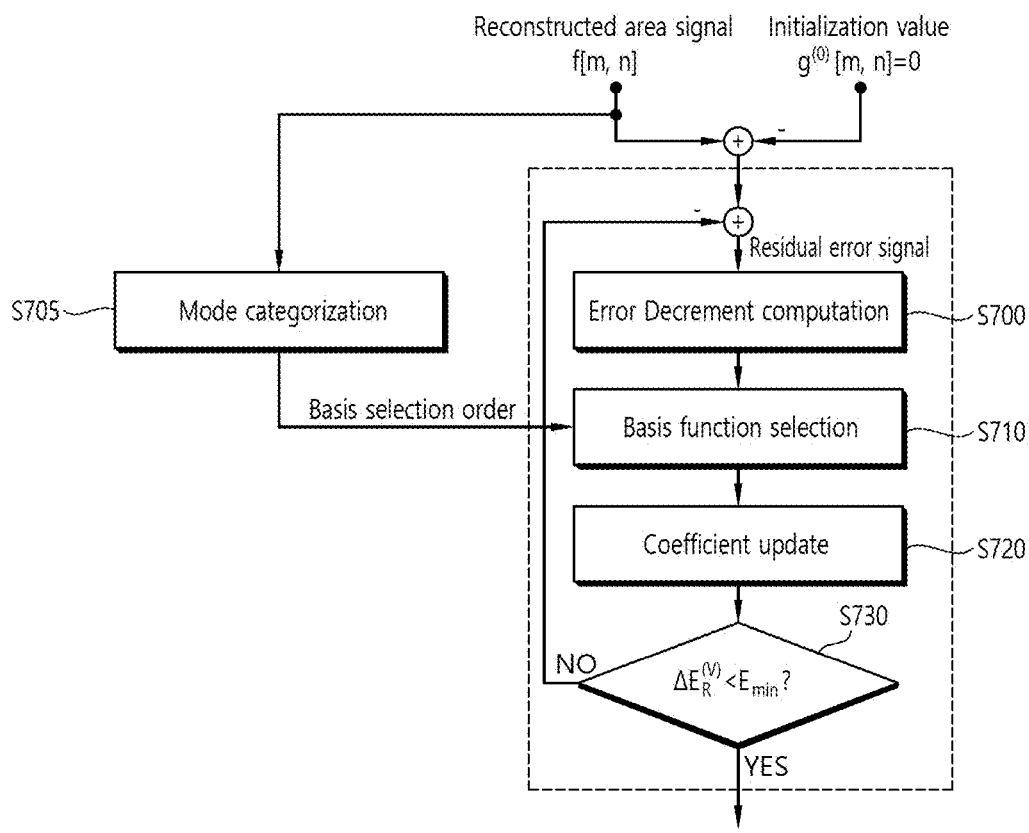
FIG. 7 schematically illustrates algorithm of the extrapolation technique using a parametric model according to the present invention, which is performed by an encoding device.

FIG. 7 schematically illustrates algorithm of the extrapolation technique using a parametric model according to the present invention, which is performed by an encoding device.

Referring to FIG. 7, an encoding device performs an error decrement computation based on a reconstructed area signal f[m,n] and an initial value $g^{(0)}[m,n]=0$ as an input signal (step, S700). In this case, an equation for a residual error signal is derived based on the input signal, and based on this, the weighted error based decrement computation may be performed.

The encoding device derives a prediction mode of a current block (step, S705). Here, the prediction mode may be a specific directional prediction mode among the conventional intra-prediction modes. Or, the prediction mode may be a mode of classifying the conventional intra-prediction modes into a horizontal mode, a vertical mode or a diagonal mode according to a similarity of a horizontal, a vertical or a diagonal direction. In this case, the encoding device may determine at least one of a range and a search order of the considered basis functions according to the prediction mode. In this case, the encoding device may further determine the number of considered basis functions according to the prediction mode. Here, the entire basis functions may include the basis functions for transform/inverse transform of a residual signal for the current block.

For example, the encoding device may determine the range of the considered basis functions according to the prediction mode. In this case, the encoding device may select the basis functions having the prediction direction property similar to the prediction direction of the prediction mode as the considered basis functions. That is, in this case, when the entire basis functions are referred to a first basis function group, a second basis function group may be derived by selecting the basis functions having the specific prediction direction property among the basis functions in the first basis function group. In this case, only the basis functions in the second basis function group may be used for the procedure below.

In addition, for example, the encoding device may determine a search order of the considered basis functions according to the prediction mode. In this case, the encoding device may select a specific basis function sequentially among the basis functions according to a priority of the basis functions according to the prediction mode. That is, in this case, the encoding device may select the basis function having a prediction direction property which is similar to the prediction direction first.

The encoding device selects a basis function among the considered basis functions (step, S710). The encoding device may select the basis function according to a predetermined range or a predetermined order among the considered basis functions.

The encoding device performs a coefficient update (step, S720). Here, the coefficient update includes a coefficient update for the extension coefficient described above. The encoding device performs the coefficient update based on the selected basis function, and determines an extension coefficient.

The encoding device calculates the weighted error criterion of $V^{th}$ iteration (i.e., $V^{th}$ index) based on the basis function and the extension coefficient, and checks whether the calculated weighted error criterion is smaller than the threshold value $\Delta E_{min}$ (step, S730). In this case, the weighted error criterion may be calculated for the whole or a predefined reconstructed area in the current picture.

In the case that the weighted error criterion is smaller than the threshold value, the encoding device derives a parametric model based on the basis function and the extension coefficient, and derives prediction samples based on the derived parametric model.

In the case that the weighted error criterion is not smaller than the threshold value, the encoding device adds 1 to the index V, and iterates the procedures described above.

Meanwhile, a maximum iteration count may be predetermined, and in this case, the encoding device may terminate the procedure when V reaches the maximum iteration count, and derive the parametric model based on the basis function and the extension coefficient for the weighted error criterion having a minimum value or the last weighted error criterion among the calculated weighted error criteria.

Although the procedures such as the error decrement computation process, the basis function selection and the coefficient update, and the weighted error criterion comparison are separately shown in FIG. 7, this is just an example for description. All of the procedures such as the basis function selection and the coefficient update, and the weighted error criterion comparison may be included in the error decrement computation process.

In addition, the encoding device may encode the basis number (NumBasis) information indicating an index of V that satisfies step S730, and transmit it to a decoding device through bitstream. Here, the basis number may be the same as the number of basis functions used in the parametric model.

Figure 8:
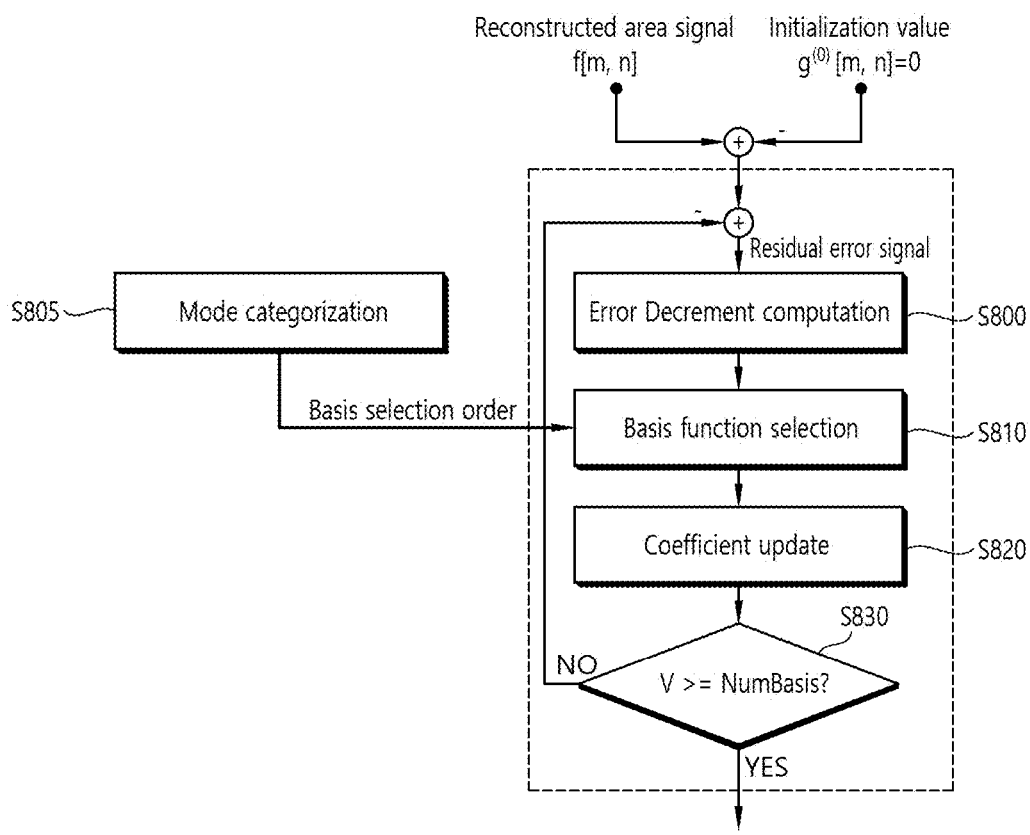
FIG. 8 schematically illustrates algorithm of the extrapolation technique using a parametric model according to the present invention, which is performed by a decoding device.

FIG. 8 schematically illustrates algorithm of the extrapolation technique using a parametric model according to the present invention, which is performed by a decoding device.

Referring to FIG. 8, a decoding device performs an error decrement computation based on a reconstructed area signal f[m,n] and an initial value $g^{(0)}[m,n]=0$ as an input signal (step, S800). In this case, an equation for a residual error signal is derived based on the input signal, and based on this, the weighted error based decrement computation may be performed.

The decoding device derives a prediction mode of a current block (step, S805). Here, the prediction mode may be a specific directional prediction mode among the conventional intra-prediction modes. Or, the prediction mode may be a mode of classifying the conventional intra-prediction modes into a horizontal mode, a vertical mode or a diagonal mode according to a similarity of a horizontal, a vertical or a diagonal direction. In this case, the decoding device may determine at least one of a range and a search order of the considered basis functions according to the prediction mode. In this case, the decoding device may further determine the number of considered basis functions according to the prediction mode. Here, the entire basis functions may include the basis functions for transform/inverse transform of a residual signal for the current block.

For example, the decoding device may determine the range of the considered basis functions according to the prediction mode. In this case, the decoding device may select the basis functions having the prediction direction property similar to the prediction direction of the prediction mode as the considered basis functions. That is, in this case, when the entire basis functions are referred to a first basis function group, a second basis function group may be derived by selecting the basis functions having the specific prediction direction property among the basis functions in the first basis function group. In this case, only the basis functions in the second basis function group may be used for the procedure below.

In addition, for example, the decoding device may determine a search order of the considered basis functions according to the prediction mode. In this case, the decoding device may select a specific basis function sequentially among the basis functions according to a priority of the basis functions according to the prediction mode. That is, in this case, the decoding device may select the basis function having a prediction direction property which is similar to the prediction direction first.

The decoding device selects a basis function among the considered basis functions (step, S810). The decoding device may select the basis function according to a predetermined range or a predetermined order among the considered basis functions.

The decoding device performs a coefficient update (step, S820). Here, the coefficient update includes a coefficient update for the extension coefficient described above. The decoding device performs the coefficient update based on the selected basis function, and determines an extension coefficient.

The decoding device checks whether the $V^{th}$ iteration (i.e., $V^{th}$ index) is the same as or greater than a basis number (NumBasis) (step, S830). Here, the basis number may be obtained from a bitstream transmitted from an encoding device.

In the case that the V is the same as or greater than the basis number, the decoding device derives the parametric model based on the basis function and the extension coefficient, and derives prediction samples based on the derived parametric model.

In the case that the V is smaller than the basis number, the decoding device adds 1 to the index V, and iterates the procedures described above.

Although the procedures such as the error decrement computation process, the basis function selection and the coefficient update, and the weighted error criterion comparison are separately shown in FIG. 8, this is just an example for description. All of the procedures such as the basis function selection and the coefficient update, and the weighted error criterion comparison may be included in the error decrement computation process.

Meanwhile, it may be indicated through flag information on whether to perform an intra-prediction based on the parametric model described above. In addition, in performing the intra-prediction based on the parametric model described above, by setting the number of considered basis functions, an amount of computation allocated for selecting a basis function may be reduced. In this case, the number of considered basis functions may be predetermined, or signaled from the encoding device to the decoding device.

For example, the intra-prediction based on the parametric model may be referred to as a basis function selection intra-prediction, and the encoding device may transmit the flag information indicating whether the basis function selection intra-prediction is used through a sequence parameter set (SPS), a picture parameter set (PPS) or a slice header.

In addition, for example, the encoding device may transmit the information for the number of considered basis functions to the decoding device through the SPS, the PPS or the slice header.

For example, the flag information and the information for the number of considered basis functions may be transmitted through the SPS.

TABLE 1

|  | Descriptor |
|---|---|
| seq_parameter_set_rbsp( ) { |  |
|     profile_idc | u(8) |
|     reserved_zero_8bits /* equal to 0 */ | u(8) |
|     level_idc | u(8) |
|     seq_parameter_set_id | ue(v) |
|     chroma_format_idc | ue(v) |
|     ... |  |
|     basis_function_selection_intra_flag | u(1) |
|     if (basis_function_selection_intra_flag) |  |
|     { |  |
|         sps_num_basis_functions_minus1 | ue(v) |
|     } |  |
|     ... |  |
| } |  |

In Table 1, the basis_function_selection_intra_flag syntax element indicates whether the basis function selection intra-prediction according to the present invention is used. The sps_num_basis_functions_minus1 syntax element indicates the number of considered basis functions when the basis function selection intra-prediction is used. The sps_num_basis_functions_minus1 syntax element may be signaled when the basis_function_selection_intra_flag syntax element value is 1.

The semantics for the syntax elements may be represented as the following table, for example.

TABLE 2 basis_function_selection_intra_flag equal to 1 specifies that the basis function selection intra prediction may be used in intra prediction process.
basis_function_selection_intra_flag equal to 0 specifies that the basis function selection intra prediction cannot be used in intra prediction process.
sps_num_basis_functions specifies the number of basis functions for the sequence when the basis function selection intra prediction is used. The value of sps_num_basis_functions shall be in the range of 0 to 15, inclusive.

That is, the basis_function_selection_intra_flag syntax element indicates whether the basis function selection intra-prediction according to the present invention is used, and when the basis_function_selection_intra_flag value is 1, this indicates that the basis function selection intra-prediction is used in the intra-prediction procedure. When the basis_function_selection_intra_flag value is 0, this indicates that the basis function selection intra-prediction is not used in the intra-prediction procedure.

The sps_num_basis_functions_minus1 indicates the number of considered basis functions when the basis function selection intra-prediction is used, and particularly, the sps_num_basis_functions_minus1+1 may correspond to the number of considered basis functions. For example, the sps_num_basis_functions_minus1 value may be one of 0 to 15 values.

In addition, for example, the information for the number of considered basis functions may be transmitted through the PPS.

TABLE 3

|  | Descriptor |
|---|---|
| pic_parameter_set_rbsp( ) { |  |
|     pic_parameter_set_id | ue(v) |
|     seq_parameter_set_id | ue(v) |
|     num_short_term_ref_pic_sets | ue(v) |
|     ... |  |
|     if ( basis_function_selection_intra_flag ) |  |
|     { |  |
|         pps_num_basis_functions_minus1 | ue(v) |
|     } |  |
|     ... |  |
| } |  |

The pps_num_basis_functions_minus1 syntax element indicates the number of considered basis functions when the basis function selection intra-prediction is used. The pps_num_basis_functions_minus1 syntax element may be signaled when the value of the basis_function_selection_intra_flag syntax element is 1.

The semantics for the syntax elements may be represented as the following table, for example.

TABLE 4 pps_num_basis_functions_minus1 specifies the number of basis functions for the picture referring to the PPS when the basis function selection intra prediction is used. The value of sps_num_basis_functions shall be in the range of 0 to 15, inclusive.

The pps_num_basis_functions_minus1 indicates the number of considered basis functions when the basis function selection intra-prediction is used, and particularly, the pps_num_basis_functions_minus1+1 may correspond to the number of considered basis functions. For example, the pps_num_basis_functions_minus1 value may be one of 0 to 15 values.

In addition, for example, the information for the number of considered basis functions may be transmitted through a slice header.

TABLE 5

|  | Descriptor |
|---|---|
| slice_header( ) { |  |
|     first_slice_in_pic_flag | u(1) |
|     if( first_slice_in_pic_flag = = 0 ) |  |
|         slice_address | u(v) |
|     slice_type | ue(v) |
|     ... |  |
|     if ( basis_function_selection_intra_flag ) |  |
|     { |  |
|         slice_num_basis_functions_minus1 | ue(v) |
|     } |  |
| } |  |

The slice_num_basis_functions_minus1 syntax element indicates the number of considered basis functions when the basis function selection intra-prediction is used. The slice_num_basis_functions_minus1 syntax element may be signaled when the value of the basis_function_selection_intra_flag syntax element is 1.

The semantics for the syntax elements may be represented as the following table, for example.

TABLE 6 slice_num_basis_functions_minus1 specifies the number of basis functions for the slice segment referring to the slice header when the basis function selection intra prediction is used. The value of sps_num_basis_functions shall be in the range of 0 to 15, inclusive.

The slice_num_basis_functions_minus1 indicates the number of considered basis functions when the basis function selection intra-prediction is used, and particularly, the slice_num_basis_functions_minus1+1 may correspond to the number of considered basis functions. For example, the pps_num_basis_functions_minus1 value may be one of 0 to 15 values.

Meanwhile, it may be configured such that various numbers of basis functions may be considered in a level unit such as a CU, a PU or a TU of a slice level or less. In this case, a decoding device may increase the coding efficiency while reducing the amount of computation for selecting a basis function more adaptively.

In this case, for example, an encoding device may directly transmit the number of considered basis functions to the decoding device. As another example, a table defining the number of basis functions may be transmitted in the syntax of a higher level such as a VPS or a SPS, and an index for the table may be transmitted in a lower level such as a CU or a PU.

It is illustrated below an example of defining the number of considered basis functions in a SPS unit as a table, and indicating an index for the considered basis functions in a CU unit in detail.

TABLE 7

| | Descriptor |
|---|---|
| seq_parameter_set_rbsp( ) { | |
|     profile_idc | u(8) |
|     reserved_zero_8bits /* equal to 0 */ | u(8) |
|     level_idc | u(8) |
|     seq_parameter_set_id | ue(v) |
|     chroma_format_idc | ue(v) |
|     ... | |
|     basis_function_selection_intra_flag | u(1) |
|     if( basis_function_selection_intra_flag ) | |
|     { | |
|         for( i=0; i<8; i++ ) | |
|         { | |
|             num_basis_functions_minus1[ i ] | ue(v) |
|         } | |
|     } | |
|     ... | |
| } | |

Here, the basis_function_selection_intra_flag syntax element indicates whether the basis function selection intra-prediction according to the present invention is used. The num_basis_functions_minus1[i] syntax element indicates the number of basis functions for index i. According to Table 7 above, a number candidate table of 8 basis functions according to index i=0 to 7 may be configured.

The semantics for the syntax elements may be represented as the following table, for example.

TABLE 8 basis_function_selection_intra_flag equal to 1 specifies that the basis function selection intra prediction may be used in intra prediction process.
basis_function_selection_intra_flag equal to 0 specifies that the basis function selection intra prediction cannot be used in intra prediction process.

TABLE 8-continued num_basis_functions_minus1[i] specifies the number of basis functions for each block size in the range of 2 to 256 when the basis function selection intra prediction is used in the intra prediction process.
num_basis_functions_minus1[i] shall be in the range of 0 to $2^{(i+1)} - 1$, inclusive.

The num_basis_functions_minus1[i] syntax element indicates the number of considered basis functions for index I, and particularly, the num_basis_functions_minus1[i]+1 may correspond to the number of considered basis functions of each index.

TABLE 9

| | Descriptor |
|---|---|
| coding_unit( x0, y0, log2CUSize ) { | |
|   if( slice_type != I ) | |
|     skip_flag[ x0 ][ y0 ] | ae(v) |
|   if( skip_flag[ x0 ][ y0 ] ) | |
|     prediction_unit( x0, y0 , log2CUSize ) | |
|   else if( slice_type != I || log2CUSize = = Log2MinCUSize ) { | |
|     if( slice_type != I ) | |
|       pred_mode_flag | ae(v) |
|     if( PredMode != MODE_INTRA || log2CUSize = = Log2MinCUSize ) | |
|       part_mode | ae(v) |
|   if ( basis_function_selection_intra_flag ) | |
|   { | |
|     cu_basis_functon_selection_intra_flag | u(1) |
|     if( cu_basis_function_selection_intra_flag ) { | |
|       num_basis_function_minus1 | ue(v) |
|     } | |
|   } | |
|   ... | |
| } | |

Here, the cu_basis_function_selection_intra_flag syntax element indicates whether the basis function selection intra-prediction is used for the corresponding coding unit. The cu_basis_function_selection_intra_flag syntax element may be signaled when the basis_function_selection_intra_flag syntax element value is 1. That is, the cu_basis_function_selection_intra_flag syntax element may be transmitted with being included in the CU syntax when the basis_function_selection_intra_flag syntax element value is 1.

The num_basis_functions_minus1 indicates the number of considered basis functions for the corresponding coding unit.

The semantics for the syntax elements may be represented as the following table, for example.

TABLE 10 cu_basis_functon_selection_intra_flag equal to 1 specifies that the basis function selection intra prediction may be used in intra prediction process for the coding unit. basis_function_selection_intra_flag equal to 0 specifies that the basis function selection intra prediction cannot be used in intra prediction process for the coding unit.
num_basis_function_minus1 specifies the number of basis functions for the coding unit when the basis function selection intra prediction is used. The value of sps_num_basis_functions shall be in the range of 0 to 15, inclusive.

That is, the cu_basis_function_selection_intra_flag syntax element indicates whether the basis function selection intra-prediction is used in the corresponding CU, and when the cu_basis_function_selection_intra_flag value is 1, this indicates that the basis function selection intra-prediction is used in the intra-prediction procedure for the corresponding CU. When the cu_basis_function_selection_intra_flag value is 0, this indicates that the basis function selection intra-prediction is not used in the intra-prediction procedure for the corresponding CU.

The num_basis_functions_minus1 syntax element indicates the number of considered basis functions for the corresponding CU, and particularly, a decoding device may determine the number indicated by an index that corresponds to the num_basis_functions_minus1 syntax element value in the preconfigured number candidate table of the basis functions in the higher level (e.g., SPS) as the number of the considered basis functions.

Meanwhile, without a transmission of the flag information indicating whether the basis function selection intra-prediction is used described above, it may be determined whether the basis function selection intra-prediction is used according to a size of each block. For example, it is configured that the basis function selection intra-prediction proposed in the present invention is used when a size of a PU or a CU is 16×16 or smaller, and the basis function selection intra-prediction is not used for a block size greater than it.

In addition, the number of considered basis functions when the basis function selection intra-prediction is used may be configured according to a size/type of a block. In this case, a decoding device may increase the prediction efficiency while an amount of computation for the basis function selection intra-prediction is reduced. In this case, a size of block may be based on a size of CU or differently defined depending on a partition type of a PU.

Alternatively, the number of considered basis functions may be determined according to a Quantization parameter (QP) of a current block. In this case, after dividing the range of QP value with a uniform interval or into several durations of various sizes as occasion demands, the number of considered basis functions may be predetermined for a specific duration.

In this case, for example, the two or more methods described above may be performed with being combined, in that it is determined whether to apply the basis function selection intra-prediction based on a size of the current block and the number of considered basis functions is determined based on the quantization parameter.

According to the present invention, more accurate intra-prediction of a sample unit may be performed, and the intra-prediction performance may be significantly improved. In addition, according to the present invention, the complexity in computation may be decreased. Through this, an amount of data for a residual signal for the current block may be removed or reduced, and overall coding efficiency may be improved.

The parametric model based intra-prediction or the basis function selection intra-prediction may be performed based on the flowchart as below, for example.

Figure 9:
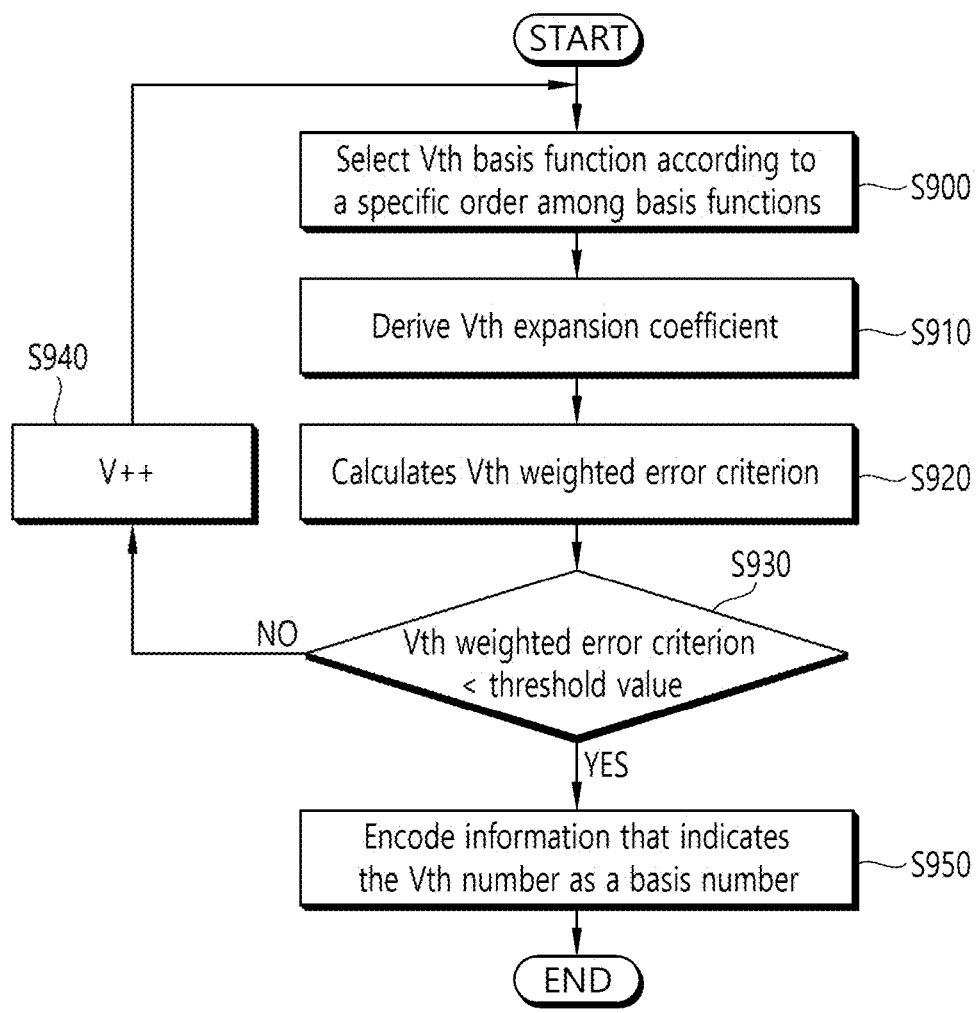
FIG. 9 schematically illustrates an example of a picture encoding method according to the present invention.

FIG. 9 schematically illustrates an example of a picture encoding method according to the present invention. The method shown in FIG. 9 may be performed by an encoding device. Particularly, for example, steps S900 to S940 in FIG. 9 may be performed by a prediction unit of the encoding device, and step S950 may be performed by an entropy encoder of the encoding device.

Referring to FIG. 9, the encoding device selects $V^{th}$ basis function for a current block according to a specific order among basis functions (step, S900). The basis functions may be basis functions for DCT, DST or DFT used for transform/inverse transform of a residual signal.

The encoding device may determine considered basis functions based on various criteria according to the present invention. As an example, the encoding device may derive an intra-prediction mode for the current block, and determine the basis functions based on the derived intra-prediction mode. In this case, the basis functions may be limited to the basis functions related to the prediction direction of the intra-prediction mode.

As another example, the number of basis functions may be determined based on a size of the current block. As another example, the number of basis functions may be determined based on QP value for the current block.

The specific order may be predefined, and may be determined based on the intra-prediction mode. For example, in this case, the priorities of the basis functions related to the prediction direction of the intra-prediction mode may be set higher, and lower index numbers may be allocated thereto.

The encoding device derives $V^{th}$ expansion coefficient based on the selected $V^{th}$ basis function (step, S910). The encoding device may derive the $V^{th}$ extension coefficient based on Equation 10 described above.

The encoding device calculates $V^{th}$ weighted error criterion based on the selected $V^{th}$ basis function and the derived $V^{th}$ extension coefficient (step, S920).

The encoding device may derive $V^{th}$ parametric model based on the selected $V^{th}$ basis function and the derived $V^{th}$ extension coefficient, generate $V^{th}$ residual error signal based on an original signal (or reconstructed signal) and the $V^{th}$ parametric model, and calculate $V^{th}$ weighted error criterion based on the $V^{th}$ basis function and the $V^{th}$ residual error signal. The encoding device may calculate the $V^{th}$ parametric model based on Equation 5 described above, for example, and calculate the $V^{th}$ weighted error criterion based on Equation 12 described above. Here, $K_v$ may be a set of the basis functions selected from the first iteration to the $V^{th}$ iteration among the basis functions, (k,l) represent the indexes of the basis functions selected from the first iteration to the $V^{th}$ iteration among the basis functions, $c^{(v)}_{k,l}$ represent an extension coefficient for the basis function corresponding to the (k,l) index, $\varphi_{k,l}$ represent the basis function corresponding to the (k,l) index, and [m,n] represent the coordinate of a target sample in the current block.

The encoding device checks whether the $V^{th}$ weighted error criterion value is smaller than a specific threshold value (step, S930).

In the case that, in step S930, the $V^{th}$ weighted error criterion value is not smaller than the specific threshold value, the encoding device adds 1 to the V value (step, S940), and repeats the procedure of step S900 and the later.

In the case that, in step S930, the $V^{th}$ weighted error criterion value is smaller than the specific threshold value, the encoding device encodes and outputs information that indicates the $V^{th}$ number as a basis number (step, S950). The encoding device may encode the information that indicates the $V^{th}$ number as a basis number and output it as a bitstream format. The bitstream may be transmitted to a decoding device through a network or a storage medium.

The encoding device may encode the information indicating the number of basis functions and transmit it to the decoding device through the bitstream. In this case, for example, a table defining the number of basis functions may be transmitted in the syntax of a higher level such as a VPS or a SPS, and an index for the table may be transmitted in a lower level such as a CU or a PU.

Figure 10:
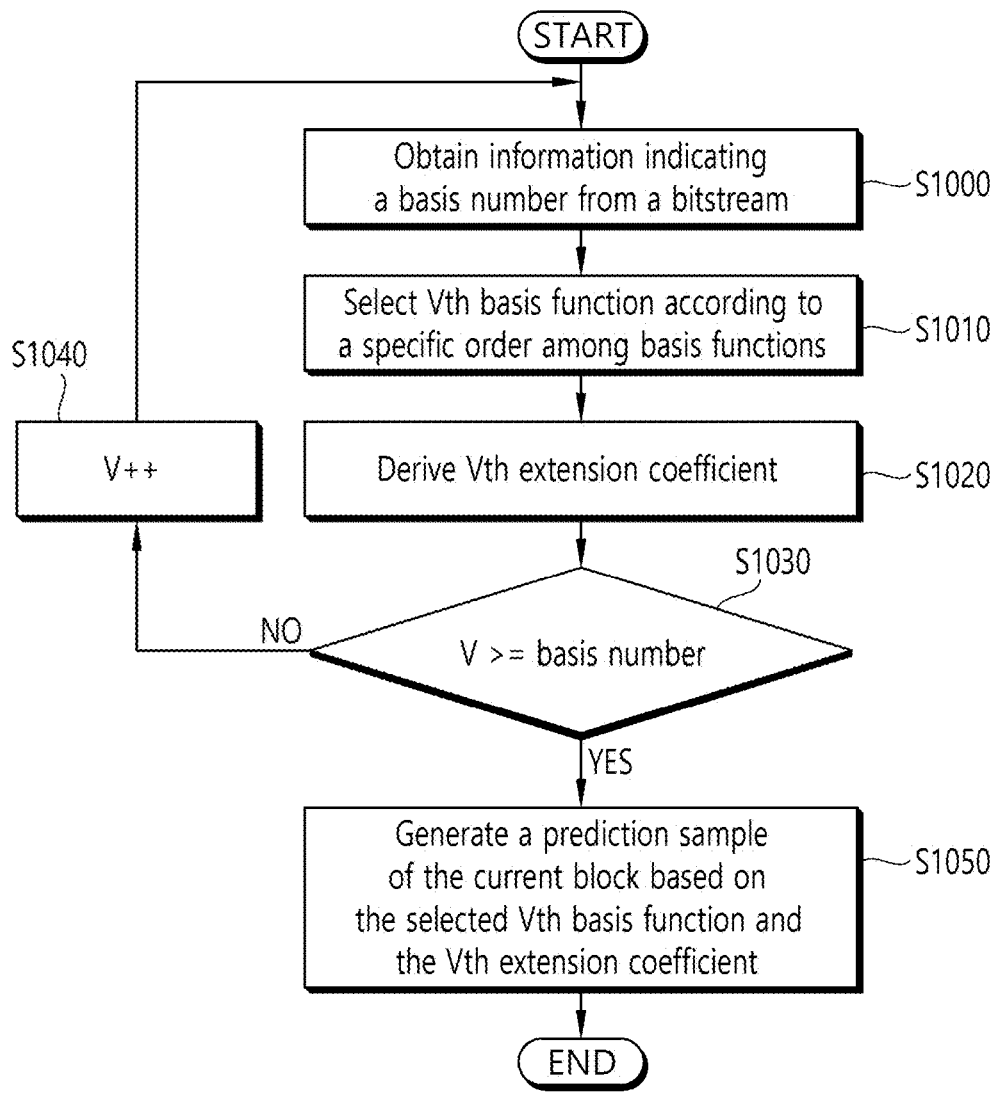
FIG. 10 schematically illustrates an example of a picture decoding method according to the present invention.

FIG. 10 schematically illustrates an example of a picture decoding method according to the present invention. The method shown in FIG. 10 may be performed by a decoding device. Particularly, for example, step S1000 in FIG. 10 may be performed by an entropy encoder of the decoding device, and steps S1010 to S1050 may be performed by a prediction unit of the decoding device.

The decoding device obtains information indicating a basis number from a bitstream (step, S1000). The bitstream may be generated by an encoding device, and received through a network or a storage medium.

The decoding device may further obtain flag information indicating whether the basis function selection intra-prediction is used from the bitstream. In the case that the flag information value indicates 1, the decoding device may obtain the information indicating the basis number from the bitstream. In the case that the flag information value indicates 0, the information indicating the basis number may not be received.

The decoding device selects $V^{th}$ basis function for a current block according to a specific order among basis functions (step, S1010). The basis functions may be basis functions for DCT, DST or DFT used for transform/inverse transform of a residual signal.

The decoding device may determine considered basis functions based on various criteria according to the present invention.

As an example, the decoding device may further obtain information for an intra-prediction mode for the current block, and determine the basis functions based on the intra-prediction mode. In this case, the basis functions may be limited to the basis functions related to the prediction direction of the intra-prediction mode.

As another example, the decoding device may further obtain information indicating the number of basis functions from the bitstream. The information indicating the number of basis functions may be obtained when the flag information value indicates 1. In this case, a table defining the number of basis functions may be transmitted in the syntax of a higher level such as a VPS or a SPS, and an index for the table may be transmitted in a lower level such as a CU or a PU.

As another example, the number of basis functions may be determined based on a size of the current block. As another example, the number of basis functions may be determined based on QP value for the current block.

The specific order may be predefined, and may be determined based on the intra-prediction mode. For example, in this case, the priorities of the basis functions related to the prediction direction of the intra-prediction mode may be set higher, and lower index numbers may be allocated thereto.

The decoding device derives $V^{th}$ expansion coefficient based on the selected $V^{th}$ basis function (step, S1020). The decoding device may derive the $V^{th}$ extension coefficient based on Equation 10 described above.

The decoding device checks whether $V^{th}$ number is equal to (or equal to or greater than) the basis number (step, S1030).

In the case that, in step S1030, the $V^{th}$ number is not smaller than or equal to the basis number, the decoding device adds 1 to the V value (step, S1040), and repeats the procedure of step S1010 and the later.

In the case that, in step S1030, the $V^{th}$ number is equal to the basis number, the decoding device generates a prediction sample of the current block based on the selected $V^{th}$ basis function and the $V^{th}$ extension coefficient (step, S1050). The prediction sample may be generated based on Equation 5 described above. In this case, in Equation 5, $K_v$ may be a set of the basis functions selected from the first iteration to the $V^{th}$ iteration among the basis functions, (k,l) represent the indexes of the basis functions selected from the first iteration to the $V^{th}$ iteration among the basis functions, $\varphi_{k,l}$ represent an extension coefficient for the basis function corresponding to the (k,l) index, $\varphi_{k,l}$ represent the basis function corresponding to the (k,l) index, and [m,n] represent the coordinate of a target sample in the current block.

In the case that a residual signal for the current block is existed, the decoding device may obtain information for the residual for the current block from the bitstream. The information for the residual may include transform coefficients for the residual signal. The decoding device may derive residual samples using the transform coefficients obtained from the bitstream. The decoding device may generate a reconstructed sample based on the prediction sample and/or the residual sample.

According to the present invention, more accurate intra-prediction of a sample unit may be performed, and accordingly, intra-prediction performance may be significantly improved. In addition, according to the present invention, a computation complexity may be reduced. Through this, an amount of data for a residual signal for a current block may be removed or reduced, and accordingly, overall coding efficiency may be improved.

The above description is only illustrative of the technical concept of the present invention. Therefore, those skilled in the art may make various modifications and variations to the above description without departing from the essential features of the present invention. Accordingly, the embodiments disclosed herein are intended to be illustrative, not limiting, of the present invention. The scope of the present invention is not limited by these embodiments. The scope of protection of the present invention should be construed according to the following claims.

The method according to the present invention described above may be implemented in software. The encoding device and/or decoding device according to the present invention may be included in a device that performs image processing, for example, for a TV, a computer, a smart phone, a set-top box, or a display device.

When the embodiments of the present invention are implemented in software, the above-described method may be implemented by modules (processes, functions, and so on) that perform the functions described above. Such modules may be stored in memory and executed by a processor. The memory may be internal or external to the processor, and the memory may be coupled to the processor using various well known means. The processor may comprise an application-specific integrated circuit (ASIC), other chipsets, a logic circuit and/or a data processing device. The memory may include a ROM (read-only memory), a RAM (random access memory), a flash memory, a memory card, a storage medium, and/or other storage device.

What is claimed is:

1. A method for encoding a picture performed by an encoding device, the method comprising:
   deriving a $V^{th}$ basis function for encoding a current block according to a specific order among basis functions, wherein the basis functions are used for a frequency transform of a residual signal of the current block, and V is a positive integer;
   deriving a $V^{th}$ extension coefficient for the $V^{th}$ basis function based on the $V^{th}$ basis function;
   deriving a $V^{th}$ parametric model for the current block based on the $V^{th}$ basis function and the derived $V^{th}$ extension coefficient;
   generating a $V^{th}$ residual error signal based on an original signal and the $V^{th}$ parametric model;

calculating a $V^{th}$ weighted error criterion based on the $V^{th}$ basis function and the $V^{th}$ residual error signal; and based on a value of the $V^{th}$ weighted error criterion being smaller than a specific threshold value, encoding information representing V as a number of basis functions used in the $V^{th}$ parametric model, wherein the parametric model is derived from following equation:

$$g^{(V)}[m, n] = \sum_{(k,l) \in K_V} c_{k,l}^{(V)} \varphi_{k,l}[m, n]$$

herein, $K_v$ is a set of the basis functions selected from a first iteration to a $V^{th}$ iteration among the basis functions, (k,l) represents indexes of the basis functions selected from the first iteration to the $V^{th}$ iteration, $c^{(v)}_{k,l}$ represents an extension coefficient for a basis function corresponding to the (k, l) index, $\varphi_{k,l}$ represents a basis function corresponding to the (k, l) index, and [m, n] represents a coordinate of a target sample in the current block.

2. The method for encoding a picture of claim 1, further comprising:
deriving an intra-prediction mode for the current block,
wherein the basis functions are derived based on the intra-prediction mode.

3. The method for encoding a picture of claim 1, further comprising:
deriving an intra-prediction mode for the current block,
wherein the specific order is determined based on the intra-prediction mode.

4. The method for encoding a picture of claim 1, further comprising:
determining whether or not an intra-prediction based on the parametric model is used; and
encoding and outputting flag information representing whether or not the intra-prediction based on the $V^{th}$ parametric model is used based on the determination result.

5. The method for encoding a picture of claim 4, wherein at least one of the intra-prediction based on the $V^{th}$ parametric model or the number of basis functions is used or determined, based on a size of the current block, respectively.

6. A method for decoding a picture performed by a decoding device, the method comprising:
obtaining information representing a number of basis functions used for a $V^{th}$ parametric model for a current block from a bitstream, wherein the basis functions are used for a frequency transform of a residual signal of the current block, and V is a positive integer;
deriving a $V^{th}$ basis function for a current block according to a specific order among the basis functions;
deriving $V^{th}$ extension coefficient for the $V^{th}$ basis function based on the $V^{th}$ basis function; and checking whether V is equal to the number of basis functions; and based on a $V^{th}$ number being equal to the number of basis functions, generating a prediction sample of the current block based on the $V^{th}$ basis function and the $V^{th}$ extension coefficient, wherein the parametric model is generated from following equation:

$$g^{(V)}[m, n] = \sum_{(k,l) \in K_V} c_{k,l}^{(V)} \varphi_{k,l}[m, n]$$

herein, $K_v$ is a set of the basis functions selected from a first iteration to a $V^{th}$ iteration among the basis functions, (k,l) represents indexes of the basis functions selected from the first iteration to the $V^{th}$ iteration, $c^{(v)}_{k,l}$ represents an extension coefficient for a basis function corresponding to the (k, l) index, $\varphi_{k,l}$ represents a basis function corresponding to the (k, l) index, and [m, n] represents a coordinate of a target sample in the current block.

7. The method for decoding a picture of claim 6, further comprising:
further obtaining information for an intra-prediction mode for the current block from the bitstream,
wherein the basis functions are derived based on the intra-prediction mode.

8. The method for decoding a picture of claim 6, further comprising:
further obtaining information for an intra-prediction mode for the current block from the bitstream,
wherein the specific order is determined based on the intra-prediction mode.

9. The method for decoding a picture of claim 6, further comprising:
obtaining flag information representing whether or not an intra-prediction based on the $V^{th}$ parametric model is used from the bitstream.

10. The method for decoding a picture of claim 9, wherein the information representing the number of basis functions is obtained, based on a value of the flag information indicating 1, from the bitstream.

11. The method for decoding a picture of claim 9, wherein at least one of the intra-prediction based on the $V^{th}$ parametric model or the number of basis functions is used or determined, based on a size of the current block, respectively.

12. The method for decoding a picture of claim 6, wherein the number of basis functions is determined based on a quantization parameter (QP) value for the current block.

* * * * *